Oct. 21, 1924.
M. B. SETTER
SELF ADJUSTING BEARING
Filed Nov. 19, 1921
1,512,807
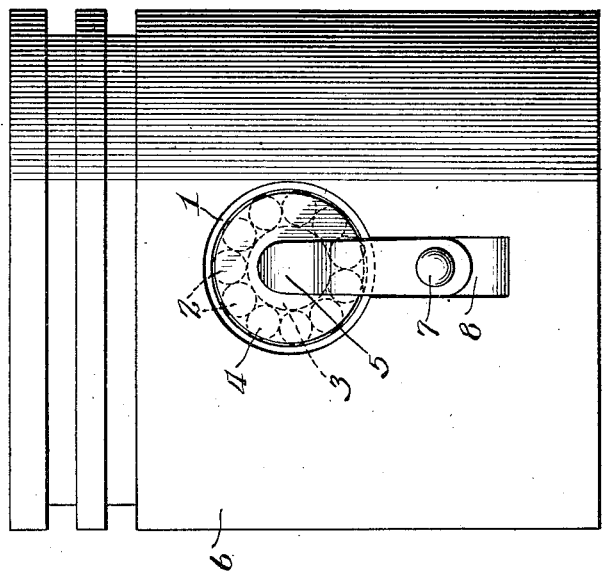
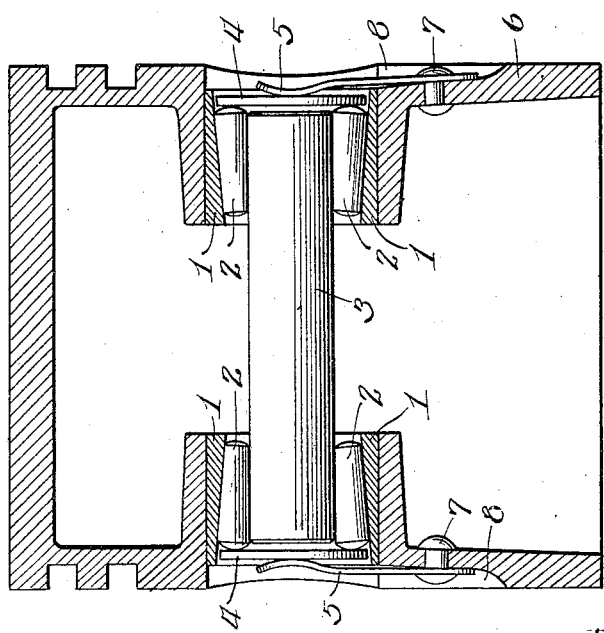
Inventor
Michael B. Setter
by Arthur H. Durand
Atty.

Patented Oct. 21, 1924.

1,512,807

UNITED STATES PATENT OFFICE.

MICHAEL B. SETTER, OF CHICAGO, ILLINOIS, ASSIGNOR OF ONE-HALF TO ALEXANDER W. HILKER, OF CHICAGO, ILLINOIS.

SELF-ADJUSTING BEARING.

Application filed November 19, 1921. Serial No. 516,444.

*To all whom it may concern:*

Be it known that I, MICHAEL B. SETTER, a citizen of the United States, and a resident of Chicago, county of Cook, State of Illinois, have invented a certain new and useful Improvement in Self-Adjusting Bearings, of which the following is a specification.

This invention relates to bearings in general but more particularly to those for internal combustion engines, and is, therefore, in the nature of an improvement on the construction covered by copending application No. 514,892 filed of even date herewith.

The object of the invention herein disclosed is to provide an improved construction and arrangement whereby a roller bearing is automatically tightened to take up wear and prevent lost motion.

It is also an object to provide certain details and features of construction and combinations tending to increase the general efficiency of a bearing of this particular character.

To these and other useful ends the invention consists in matters hereinafter set forth and claimed and shown in the accompanying drawings in which:

Figure 1 is a vertical section of a piston having bearings embodying the principles of the invention.

Figure 2 is a side elevation of said piston.

As thus illustrated, the invention comprises bushings 1 and 1 which are tapered internally to receive the tapered rollers or antifriction elements 2 which support the cylindric member 3, so that the latter may turn or rotate in the two roller bearings thus formed. Plates 4 bear against the outer ends of the rollers 2, and springs 5 bear against said plates, whereby said rollers are pushed inward, automatically, as fast as wear occurs in the bearings.

As shown, the invention is applied to an internal combustion engine, and for that purpose the bushings 1 are held in the sides of a piston 6 of any suitable character. The plates 4, in such case, are of a size to fit the openings in the bushings 1, and the springs 5 are secured by rivets 7 to said piston, in recesses 8 formed in the sides of said piston. The pitman (not shown) is clamped on the pin 3, as usual, and the crank shaft (not shown) is connected in the usual manner with the lower end of said pitman. Thus, the bearings are automatically tightened while the piston is in motion, and lost motion is avoided between the piston and the crank shaft.

Of course, the invention may be applied to bearings having antifriction means of any suitable or desired character, but is particularly desirable in connection with a bearing which follows a shifting axis, so that the wear or lost motion is desirably taken up while the bearing is in motion.

What I claim as my invention is:

1. In a bearing, antifriction elements, means upon which said elements roll, and automatic means engaging said elements to tighten said bearing to take up wear, said elements comprising tapered rollers, said automatic means comprising a plate bearing against the larger ends of said rollers and a spring bearing against said plate to force said rollers endwise in the direction of the taper thereof, a cylindric member having shifting motion and also arranged to turn on said rollers, and means whereby said bearing follows the shifting axis of said member, whereby the bearing is automatically tightened while in motion.

2. In an engine piston, the combination of an oscillatory wrist pin, and self tightening roller bearings to support the end portions of said wrist pin in the side walls of the piston, said bearings having discs which engage the outer ends of the rollers, and springs pressing against said discs to keep the bearings tight.

3. In an engine piston, the combination of an oscillatory wrist pin, and self tightening roller bearings to support the end portions of said wrist pin in the side walls of the piston, the rollers of said bearings being tapered and movable endwise in the direction of the taper thereof.

MICHAEL B. SETTER.